United States Patent
Park et al.

(10) Patent No.: US 9,906,397 B2
(45) Date of Patent: Feb. 27, 2018

(54) MESSAGE TRANSMISSION AND RECEPTION TECHNIQUE USING CHANNEL COMBINING AND SPLITTING

(71) Applicant: Samsung Electronics Co., Ltd, Gyeonggi-do (KR)

(72) Inventors: Woo-Myoung Park, Gyeonggi-do (KR); Seok-Ki Ahn, Gyeonggi-do (KR); Chi-Woo Lim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/323,706

(22) PCT Filed: Dec. 16, 2015

(86) PCT No.: PCT/KR2015/013823
§ 371 (c)(1),
(2) Date: Jan. 3, 2017

(87) PCT Pub. No.: WO2016/099157
PCT Pub. Date: Jun. 23, 2016

(65) Prior Publication Data
US 2017/0288936 A1     Oct. 5, 2017

(30) Foreign Application Priority Data

Dec. 18, 2014   (KR) .................. 10-2014-0182869

(51) Int. Cl.
*H04L 5/12*       (2006.01)
*H04L 27/36*      (2006.01)
(Continued)

(52) U.S. Cl.
CPC .......... *H04L 27/362* (2013.01); *H04L 1/0054* (2013.01); *H04L 27/38* (2013.01); *H04W 24/02* (2013.01)

(58) Field of Classification Search
CPC ... H04L 1/0054; H04L 1/0003; H04L 5/0092; H04L 1/203; H04H 20/57; H03M 13/15;
(Continued)

(56) References Cited

U.S. PATENT DOCUMENTS

2003/0118123 A1* 6/2003 Hudson ................. H04L 1/0003
375/295
2012/0030541 A1* 2/2012 Okamura ........... H03M 13/1117
714/758
(Continued)

FOREIGN PATENT DOCUMENTS

WO       2014098537 A1    6/2014

OTHER PUBLICATIONS

International Search Report dated Mar. 31, 2016 in connection with International Application No. PCT/KR2015/013823, 5 pages.

*Primary Examiner* — Rahel Guarino

(57) ABSTRACT

The present disclosure provides a method for transmitting messages using a channel combining/splitting transmission scheme for a 5G or pre-5G communication system. The method comprising: splitting the messages into a first part to be transmitted to a first channel, which is a degradation channel, and a second part to be transmitted to a second channel, which is an enhancement channel, generating first modulation signals by performing a channel encoding and frequency quadrature amplitude modulation on the first part and generating second modulation signals by performing a channel encoding and quadrature amplitude modulation on the second part, generating first transmission signals by combining the first modulation signals with a part of or all the second modulation signals and generating second trans- (Continued)

mission signals using the second modulation signals, and transmitting the generated first transmission signals and second transmission signals through the first channel and the second channel.

20 Claims, 9 Drawing Sheets

(51) Int. Cl.
    *H04L 27/38*     (2006.01)
    *H04L 1/00*     (2006.01)
    *H04W 24/02*     (2009.01)

(58) Field of Classification Search
    CPC .......... H03M 13/1111; H03M 13/3927; H03M 13/114; H03M 13/1191; H03M 13/1145; H03M 13/255; H03M 13/6525; H03M 13/653
    USPC .......................... 714/780, 794; 375/341, 262
    See application file for complete search history.

(56) References Cited

U.S. PATENT DOCUMENTS

| | | |
|---|---|---|
| 2012/0272118 A1 | 10/2012 | Shen et al. |
| 2014/0247782 A1 | 9/2014 | Arambepola et al. |
| 2014/0269992 A1 | 9/2014 | Hong et al. |
| 2014/0314005 A1 | 10/2014 | Sagong et al. |
| 2015/0358194 A1 | 12/2015 | Yu et al. |

* cited by examiner

MESSAGE TRANSMISSION AND RECEPTION TECHNIQUE USING CHANNEL COMBINING AND SPLITTING

CROSS-REFERENCE TO RELATED APPLICATIONS AND CLAIM OF PRIORITY

The present application claims priority under 35 U.S.C. § 365 to International Patent Application No. PCT/KR2015/013823 filed Dec. 16, 2015, entitled "MESSAGE TRANSMISSION AND RECEPTION TECHNIQUE USING CHANNEL COMBINING AND SPLITTING", and, through International Patent Application No. PCT/KR2015/013823, to Korean Patent Application No. 10-2014-0182869 filed Dec. 18, 2014, each of which are incorporated herein by reference into the present disclosure as if fully set forth herein.

TECHNICAL FIELD

The present disclosure relates to a technique for improving a transmission rate for a user with a low Signal to Interference plus Noise Ratio (SINR), and more particularly, to a technique for improving a transmission rate for a user in a cell-edge environment.

BACKGROUND ART

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond 4G network communication system or a post Long Term Evolution (LTE) system.

To achieve a high data transmission rate, implementing a 5G communication system in an extremely high frequency (mmWave) band (for example, a 60 GHz band) is considered. To relieve the path loss of signals and to increase the transmission distance of signals in an extremely high frequency band, beamforming, massive Multiple-Input And Multiple-Output (massive MIMO), Full Dimensional MIMO (FD-MIMO), array antenna, analog beamforming, and large scale antenna techniques are under discussion for a 5G communication system.

Further, to improve the network of the system, technical development in an evolved small cell, an advanced small cell, a cloud Radio Access Network (cloud RAN), an ultra-dense network, Device to Device (D2D) communication, wireless backhaul, a moving network, cooperative communication, Coordinated Multi-Points (CoMP), and interference cancellation is progressing for the 5G communication system.

In addition, an Advanced Coding Modulation (ACM) scheme including Hybrid Frequency Shift Keying and Quadrature Amplitude Modulation (FQAM) and Sliding Window Superposition Coding (SWSC) and an advanced access technique including Filter Bank Multi Carrier (FBMC), Non Orthogonal Multiple Access (NOMA), and Sparse Code Multiple Access (SCMA) are developing in the 5G system.

A Gaussian model is considered for an interference signal in order to conduct operations, such as modulation and encoding management, soft-decision decoding metric generation, and the like, with low complexity in a communication system. A Quadrature Amplitude Modulation (QAM)-based modulation scheme is generally used to render a property of an interference signal maximally close to Gaussian. However, since a non-Gaussian channel has a higher channel capacity than a Gaussian channel, a higher network throughput may be obtained in the non-Gaussian channel than in the Gaussian channel if properly reflecting the statistical properties of interference signals in system management. Accordingly, a modulation scheme for rendering an interference signal non-Gaussian is required. For this reason, Frequency and QAM (FQAM) is suggested as a modulation scheme.

FIG. 1 is a view illustrating the concept of an FQAM scheme.

As illustrated in FIG. 1, FQAM is a hybrid modulation scheme 120 in which a QAM scheme 100 and a Frequency Shift Keying (FSK) modulation scheme 110 are combined and has a property of rendering an interference signal non-Gaussian similar to FSK. Further, the FQAM scheme may substantially improve spectral efficiency (SE), as compared with the FSK scheme, by further applying the QAM scheme. FIG. 1 illustrates a 16 FQAM scheme 120 for representing $2^4=16$ pieces of information, in which a 4 QAM scheme 100 for representing to 2 bits is combined with the FSK scheme 110 using four frequencies.

FQAM renders a property of an interference signal from a neighboring cell non-Gaussian to exhibit excellent performance in a low SINR area, as compared with QAM. However, according to the distribution of the SINRs of users scheduled by a Long Term Evolution (LTE)-based base station using a proportional fairness (PF) scheduler or the like, there is a very small proportion of users in an area where FQAM exhibits a performance gain as compared with QAM. FQAM generally has a lower SE than QAM, and FQAM shows a higher performance than QAM in an SINR area of about −3 dB or less. According to the distribution of the SINRs of users scheduled by the LTE-based base station, there are less than 1% of users in −3 dB or less, and thus there are few users at which FQAM is targeted.

That is, a very low proportion of users may experience an improved effect in spectral efficiency through FQAM.

DETAILED DESCRIPTION OF THE INVENTION

Technical Problem

The present disclosure provides a method and a device for applying both Frequency and Quadrature Amplitude Modulation (FQAM) and Quadrature Amplitude Modulation (QAM) to increase the proportion of users that may experience an increase in spectral efficiency.

The present disclosure provides a technique for separately managing a frequency band using QAM and a frequency band using FQAM in order to maximally obtain non-Gaussian interference properties while using FQAM.

The present disclosure provides a technique for applying a channel combining/splitting technique in applying a technique in which both FQAM and QAM are applied to data transmitted to one user equipment.

The present disclosure provides a technique for compensating for the performance of a degraded channel that occurs by the application of a channel combining/splitting technique to data transmitted to one user equipment.

Technical Solution

The present disclosure suggests a method of transmitting a message using a channel combining/splitting transmission scheme, which is a transmission scheme for combining transmission signals through a first channel with part or all of transmission signals through a second channel, in a wireless communication system including at least two communication channels, the method including: splitting the message into a first part to be transmitted through the first channel, which is a degraded channel, and a second part to be transmitted through the second channel, which is an enhanced channel; generating a first modulation signal by performing channel encoding and Frequency and Quadrature Amplitude Modulation (FQAM) on the first part and generating a second modulation signal by performing channel encoding and Quadrature Amplitude Modulation (QAM) on the second part; generating a first transmission signal by combining the first modulation signal with part or all of the second modulation signal and generating a second transmission signal using the second modulation signal; and transmitting the generated first transmission signal and second transmission signal through the first channel and the second channel, respectively.

The present disclosure suggests a method of receiving a message from a transmission device using a channel combining/splitting transmission scheme, which is a transmission scheme for combining transmission signals through a first channel with part or all of transmission signals through a second channel, in a wireless communication system including at least two communication channels, the method including: demodulating a first reception signal in view of both the first reception signal received through the first channel, which is a degraded channel, and a second reception signal received through the second channel, which is an enhanced channel, and calculating a Log Likelihood Ratio (LLR) of the first reception signal; and channel-decoding the first reception signal using the LLR of the first reception signal, and acquiring a first codeword.

The present disclosure suggests a device for transmitting a message using a channel combining/splitting transmission scheme, which is a transmission scheme for combining transmission signals through a first channel with part or all of transmission signals through a second channel, in a wireless communication system including at least two communication channels, the device including: a controller that splits the message into a first part to be transmitted through the first channel, which is a degraded channel, and a second part to be transmitted through the second channel, which is an enhanced channel, generates a first modulation signal by performing channel encoding and Frequency and Quadrature Amplitude Modulation (FQAM) on the first part, generates a second modulation signal by performing channel encoding and Quadrature Amplitude Modulation (QAM) on the second part, generates a first transmission signal by combining the first modulation signal with part or all of the second modulation signal, and generates a second transmission signal using the second modulation signal; and a transceiver that transmits the generated first transmission signal and second transmission signal through the first channel and the second channel, respectively.

The present disclosure suggests a device for receiving a message from a transmission device using a channel combining/splitting transmission scheme, which is a transmission scheme for combining transmission signals through a first channel with part or all of transmission signals through a second channel, in a wireless communication system including at least two communication channels, the method including: a transceiver that receives a first reception signal through the first channel, which is a degraded channel, and receives a second reception signal through the second channel, which is an enhanced channel; and a controller that demodulates the first reception signal in view of both the first reception signal and the second reception signal, calculates a Log Likelihood Ratio (LLR) of the first reception signal, channel-decodes the first reception signal using the LLR of the first reception signal, and acquires a first codeword.

Advantageous Effects

Although a decrease in the power of a transmission signal through a degraded channel and an increase in the power of a transmission signal through an enhanced channel may occur in a channel combining/splitting technique, the present disclosure may apply FQAM to a transmission signal through a degraded channel, thereby increasing the spectral efficiency of the degraded channel and improving performance (such as FER).

By transmitting a message using channel combining/splitting according to the present disclosure, a user equipment located on a cell edge (for example, a UE experiencing a channel with the bottom 5% SINR) has a performance gain as compared with QAM.

In a low SINR area (about −4 to 3 dB) that a UE may have in a cellular environment, the spectral efficiency gain of a channel combining/splitting technique according to the present disclosure in comparison with QAM may be about two to four times higher than a gain in the case where FQAM is applied alone.

MODE FOR CARRYING OUT THE INVENTION

Figure 1:
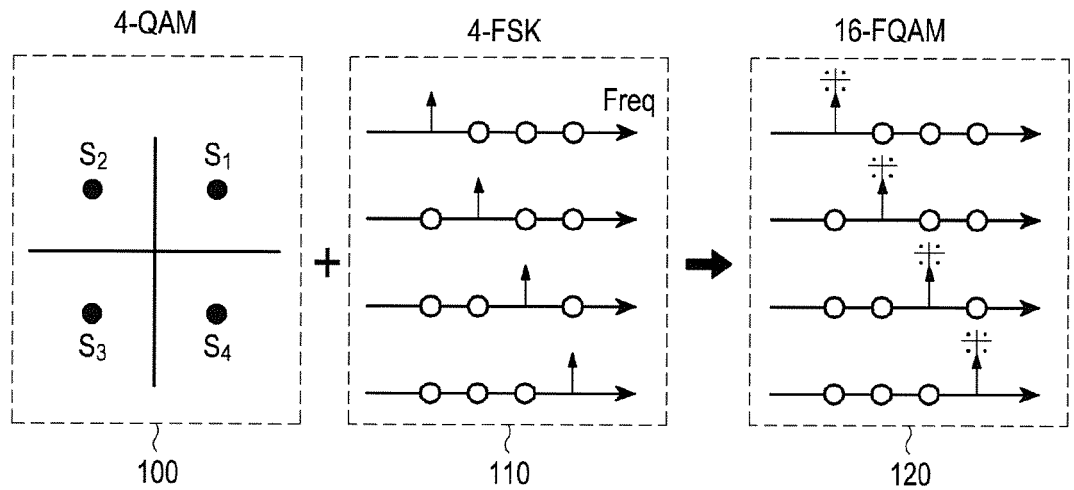
FIG. 1 is a view illustrating the concept of an FQAM scheme.

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the detailed description of the present disclosure, an example of interpretable meanings of some terms used in the present disclosure is proposed. However, it is noted that the terms are not limited to the examples of the construable meanings which are proposed below.

A base station is a main body communicating with a User Equipment (UE), and may be referred to as a BS, a Node B (NB), an eNode B (eNB), an Access Point (AP) or the like.

The user equipment is a subject communicating with the BS, and may be referred to as a UE, a Mobile Station (MS), a Mobile Equipment (ME), a device, a terminal and the like.

A polar code suggested by Erdal Arikan proves that channel capacity is achieved using a channel combining/splitting technique. When two identical channels are subjected to combining and splitting, a phenomenon called polarization occurs, in which one channel is degraded and the other channel has improved performance. Strictly, channel combining is a generalized term for an operation occurring at a transmitting side (that is, part or the entirety of a symbol transmitted through one channel of the two channels is combined with a symbol transmitted through the other channel), and splitting is a generalized term for an operation occurring at a receiving side (that is, part or the entirety of a transmission signal of one channel is separated from a signal received through the other channel). However, it should be noted in the present disclosure that the term "channel combining/splitting" is used to represent only properties at the transmitting side.

The present disclosure suggests a method in which a base station or User Equipment (UE) splits an effective channel experienced by the UE into two channels (W−: degraded channel and W+: enhanced channel) using a channel combining and splitting technique and applies a modulation technique with higher performance at a low Signal to Interference plus Noise Ratio (SINR) than Quadrature Amplitude Modulation (QAM) to the degraded channel (W−), which may occur by the polarization phenomenon, thereby increasing a transmission rate. For example, the modulation technique applied to the degraded channel may be a Frequency and Quadrature Amplitude Modulation (FQAM) or Frequency-Shift Keying (FSK) modulation scheme, which exhibits higher performance at a low SINR than QAM.

Here, it should be noted that the two channels polarized by the channel combining and splitting technique are only channels to be subjected to different modulation techniques but are not physically changed communication channels. That is, the base station or UE according to the present disclosure may divide messages to transmit into two groups and may transmit the messages through the two channels (W− and W+) while changing effective channel conditions by applying different modulation schemes. Although a channel is split into two channels by the channel combining/splitting technique in this description, a channel may be split into a larger number of channels. Preferably, a transmission channel may be split into $2^n$ (n=1, 2, . . . ) channels. For convenience, the following description illustrates only a case in which a channel is split into two channels.

Figure 2:
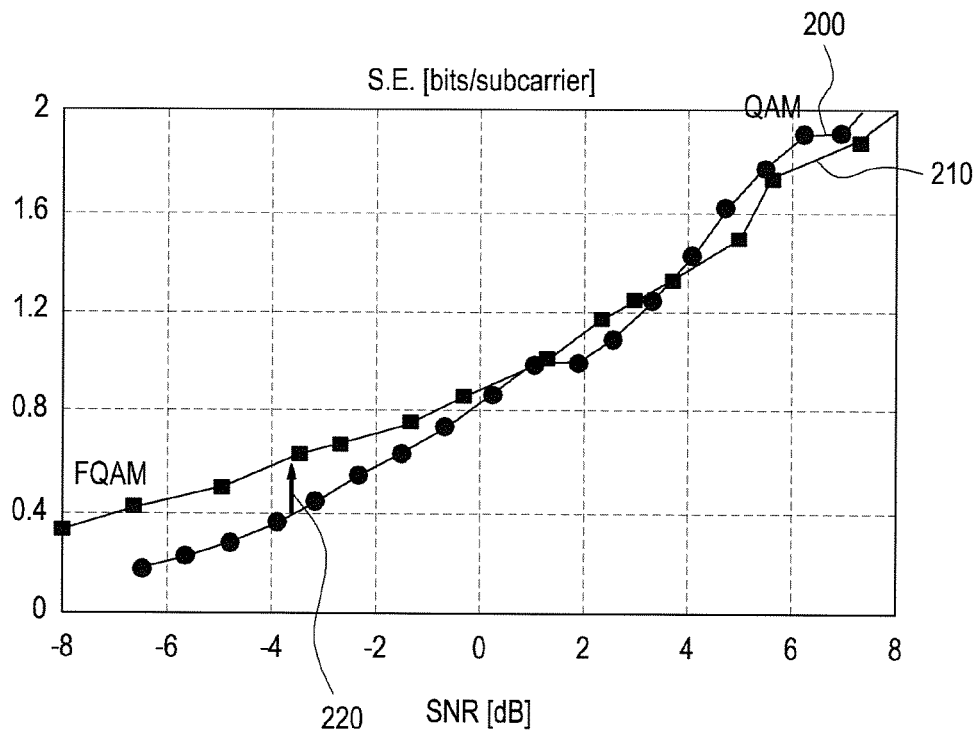
FIG. 2 is a graph illustrating SE performance results according to SNR in an FQAM scheme and a QAM scheme.

FIG. 2 is a graph illustrating Spectral Efficiency (SE) performance results according to Signal to Noise ratio (SNR) in an FQAM scheme and a QAM scheme.

In FIG. 2, a line indicated by 200 represents performance according to the QAM scheme and a line indicated by 210 represents performance according to the FQAM scheme. It is shown that the FQAM scheme has an SE gain (for example, 220) at a low SNR as compared with the QAM scheme.

For example, for the bottom 5% of users (users having an SINR of about −4 dB 1 dB), which may be called cell-edge users, in a cellular communication environment, channel combining and splitting may be applied and a superior modulation technique (for example, FQAM and FSK) to QAM may be applied to a degraded channel, thereby increasing a transmission rate for the cell-edge users.

Figure 3:
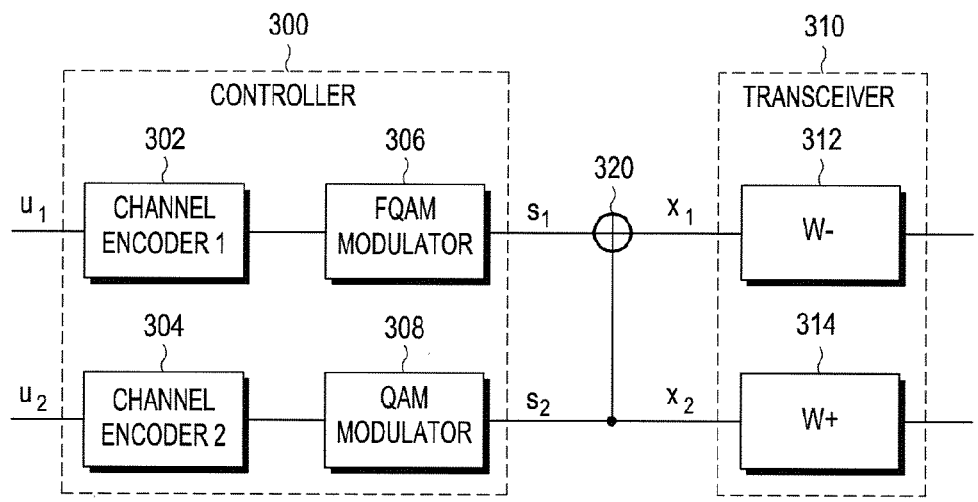
FIG. 3 is a view schematically illustrating a configuration of a transmission device according to the present disclosure.

FIG. 3 is a view schematically illustrating a configuration of a transmission device according to the present disclosure.

The transmission device may be a base station (in downlink transmission) or may be a UE (in uplink transmission). The transmission device may include one or more channel encoders 302 and 304 and one or more modulators 306 and 308. The channel encoders 302 and 304 and the modulators 306 and 308 may be integrated into one component, for example, a controller 300. The transmission device may further include a transceiver 310 to perform wireless transmission and reception. The transceiver 310 may be a wireless transceiving module to realize one or more transmission channels 312 and 314.

It would be understood that all operations of the transmission device (that is, the base station or UE described in the present disclosure are controlled or performed by the controller 300. Although FIG. 3 shows the controller 300 and the transceiver 310 as separate components for convenience, the controller 300 and the transceiver 310 may be configured as one component.

For example, when the base station intends to send a message by applying a channel combining/splitting method according to the present disclosure, the transmission device (that is, the base station) may simultaneously allocate a resource using FQAM (for example, the channel encoder 302, the FQAM modulator 306, and the like) and a resource using QAM (for example, the channel encoder 304, the QAM modulator 308, and the like) to a scheduled UE.

The base station may split a message u to be transmitted to a random UE (for example, a UE located in a cell-edge environment) into two parts ($u_1$ and $u_2$) and may perform encoding and modulation on each split part to generate a transmission signal. Here, the entire message u may be divided into $u_1$ and $u_2$ in proportion to the spectral efficiencies of two transmission channels W− and W+, in which $u_1$ and $u_2$ may be separated with the same size. A specific method for dividing a message in proportion to the spectral efficiency of a transmission channel will be described in detail in FIG. 9 (particularly, in relation to operation 916).

The base station may respectively apply the channel encoder 1 302 and the channel encoder 304 to split $u_1$ and $u_2$ and may respectively apply the FQAM modulator 306 and the QAM modulator 308 thereto, thereby generating modulated symbols $s_1$ and $s_2$.

The base station overlaps (or superposes) the modulated symbols $s_1$ and $s_2$ to generate a first transmission signal $x_1$. The base station uses the modulated symbol $s_2$ as a second transmission signal $x_2$ as it is.

A method of overlapping modulated symbols in a first transmission signal generation procedure of the transmission device is described with reference to FIG. 4 to FIG. 7.

Figure 4:
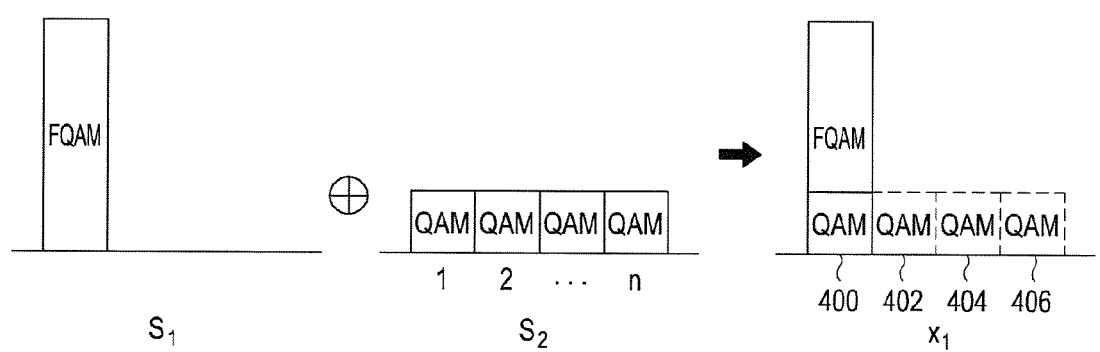
FIG. 4 is a view illustrating the concept of a first superposition mode in a transmission signal generation procedure according to the present disclosure.

FIG. 4 is a view illustrating the concept of a first superposition mode in the transmission signal generation procedure according to the present disclosure.

The first superposition mode (or mode 1) is a mode in which the number of all active tones of QAM signals ($s_2$) is rendered the same as the number of all active tones of an FQAM signal ($s_1$) and the transmission device overlaps (superposes) (only) part of the QAM signals ($s_2$) with (onto) the FQAM signal ($s_1$). Therefore, the first superposition mode may be referred to as a partial superposition mode. In the first superposition mode, the transmission device may sequentially arrange the signals $s_1$ and $s_2$ to selectively overlap only a signal $s_2$ at a specific position. For example, in the first superposition mode, the signal $s_1$ may overlap only a signal $s_2$ 400 at the position of an active tone, and only a signal $s_2$ at a predetermined position or a signal $s_2$ at a position indicated by another entity (for example, the base station) may overlap the signal $s_1$.

In the first superposition mode, symbols 402, 404, and 406 of non-overlapping QAM signals ($s_2$) are not transmitted through $x_1$, and the overlapping signal has the same form as the FQAM signal ($s_1$), thus maintaining an alpha value. Here, the alpha value is a variable that indicates the extent of being non-Gaussian, and a lower alpha value indicates a higher non-Gaussianity. The total number of symbols of the QAM signals is n times the total number of symbols of the FQAM signal, where n is an order of an FSK technique applied to the symbols of the FQAM signal (that is, the number of frequency carriers). Here, an overlapping ratio, which is the ratio of symbols overlapping the symbols of the FQAM signal to all symbols of the QAM signals, is 1/n.

When the signal $s_1$ and the signals $s_2$ overlap, the transmission device may adjust and add the transmission powers $P_1$ and $P_2$ of $s_1$ and $s_2$. The transmission device may adjust the extent of the degradation of a channel W− used to transmit the signal $x_1$ through the adjustment of $P_1$ and $P_2$. The transmission signal $x_1$ generated by the application of the transmission powers may be expressed as below.

$$x_1 = \sqrt{P_1} \times s_1 + \sqrt{P_2} \times s_2 \quad \text{[Equation 1]}$$

Preferably, $P_1$ may be greater than or equal to $P_2$.

Figure 5:
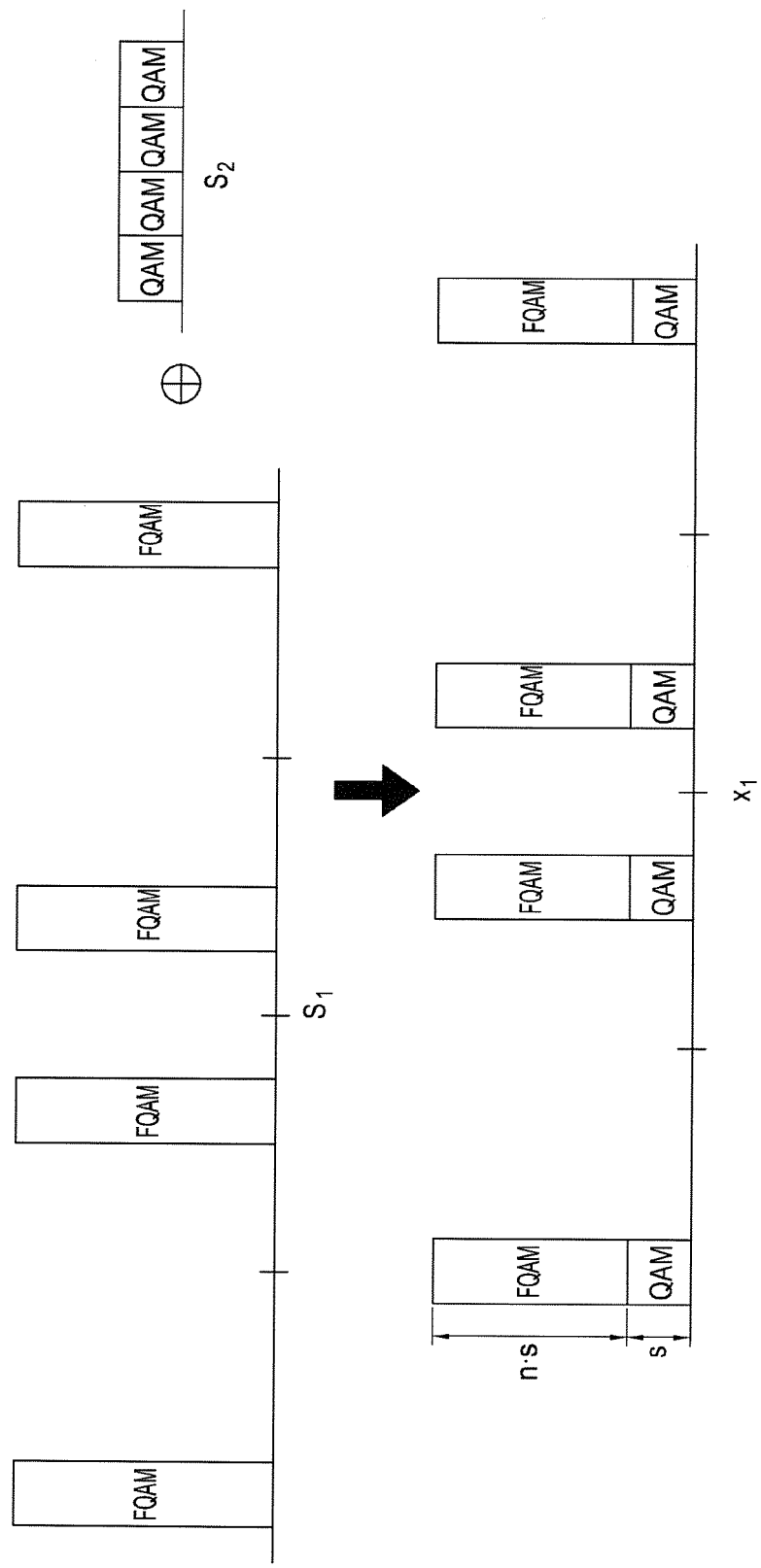
FIG. 5 is a view illustrating the concept of a second superposition mode in the transmission signal generation procedure according to the present disclosure.

FIG. 5 is a view illustrating the concept of a second superposition mode in the transmission signal generation procedure according to the present disclosure.

The second superposition mode (or mode 2) is a mode in which the transmission device generates the same number of symbols, which correspond to active tone positions, among FQAM signals ($s_1$) as the number of symbols of QAM signals ($s_2$) to overlap the symbols with the symbols of the QAM signals ($s_2$). Therefore, the second superposition mode may be referred to as a full superposition mode. That is, in the second superposition mode, the transmission device may sequentially select signals $s_2$ to overlap the signals $s_2$ with the symbols transmitted at the active tone positions among the signals $s_1$.

In the second superposition mode, the overlapping signals have the same form as the FQAM signals ($s_1$), thus maintaining the alpha value. An overlapping ratio, which is the ratio of symbols overlapping the symbols of the FQAM signals to all symbols of the QAM signals, is 1 (=1/1). Here, the symbols of the FQAM signals have a tone of a size (=n*s) n times that of the symbols of the QAM signals. When the signals $s_1$ and the signals $s_2$ overlap, the transmission device may adjust and add the transmission powers $P_1$ and $P_2$ of $s_1$ and $s_2$. Preferably, $P_1$ may be greater than or equal to $P_2$.

Figure 6:
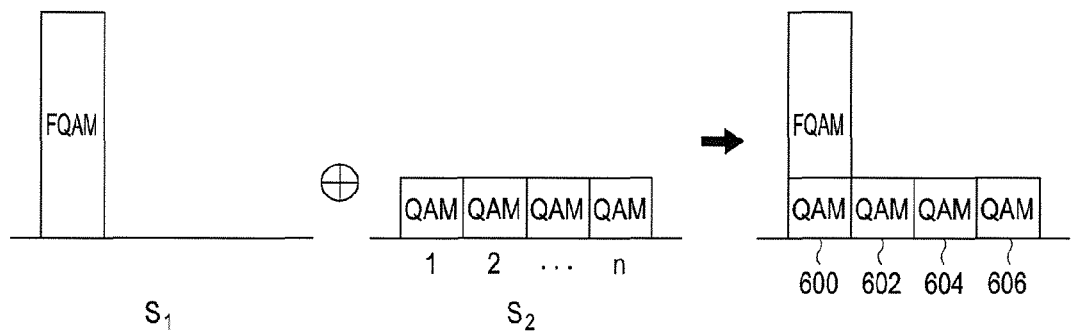
FIG. 6 is a view illustrating the concept of a third superposition mode in the transmission signal generation procedure according to the present disclosure.

FIG. 6 is a view illustrating the concept of a third superposition mode in the transmission signal generation procedure according to the present disclosure.

The third superposition mode (or mode 3) is a mode in which the transmission device overlaps (only) part of QAM signals ($s_2$) with an FQAM signal ($s_1$) but also transmits, as interference signals, a greater number of symbols of QAM signals ($s_2$) than the total number of active tones of the FQAM signal ($s_1$). In the third superposition mode, the transmission device may sequentially arrange the signals $s_1$ and $s_2$ to selectively overlap only a signal $s_2$ at a specific position. For example, in the third superposition mode, the signal $s_1$ may overlap only a signal $s_2$ 600 at the position of an active tone, and only a signal $s_2$ at a predetermined position or a signal $s_2$ at a position indicated by another entity (for example, the base station) may overlap the signal $s_1$.

In the third superposition mode, symbols 602, 604, and 606 of the QAM signals ($s_2$) not overlapping with the FQAM signal ($s_1$) are also transmitted, and the alpha value may be increased due to the symbols 602, 604, and 606 of the QAM signals $s_2$ as compared with the first superposition mode. When the signal $s_1$ and the signals $s_2$ overlap, the transmission device may adjust and add the transmission powers $P_1$ and $P_2$ of $s_1$ and $s_2$. Preferably, $P_1$ may be greater than or equal to $P_2$.

Figure 7:
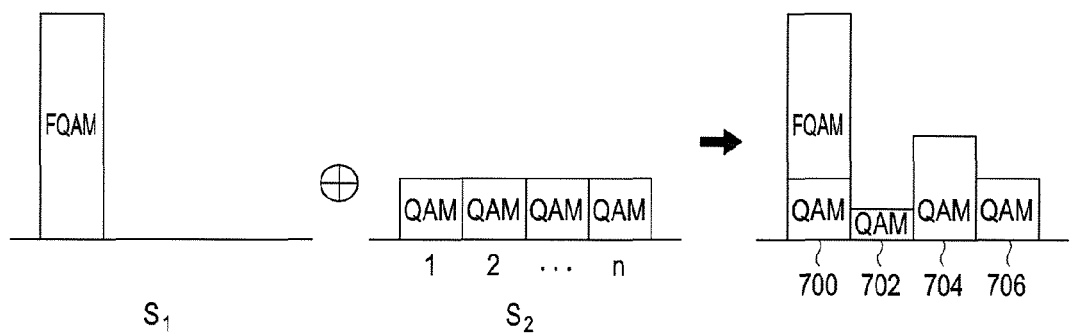
FIG. 7 is a view illustrating the concept of a fourth superposition mode in the transmission signal generation procedure according to the present disclosure.

FIG. 7 is a view illustrating the concept of a fourth superposition mode in the transmission signal generation procedure according to the present disclosure.

The fourth superposition mode (or mode 4) is a mode in which the transmission device changes QAM signals ($s_2$) according to a predetermined power pattern to overlaps (only) part of the QAM signals ($s_2$) with an FQAM signal ($s_1$) and also transmits, as interference signals, a greater number of symbols of QAM signals ($s_2$) than the total number of active tones of the FQAM signal ($s_1$). In the fourth superposition mode, the transmission device may sequentially arrange the signals $s_1$ and $s_2$ to selectively overlap only a signal $s_2$ at a specific position. For example, in the fourth superposition mode, the signal $s_1$ may overlap only a signal $s_2$ 700 at the position of an active tone, and only a signal $s_2$ at a predetermined position or a signal $s_2$ at a position indicated by another entity (for example, the base station) may overlap the signal $s_1$.

In the fourth superposition mode, symbols 702, 704, and 706 of the QAM signals ($s_2$) not overlapping with the FQAM signal ($s_1$) are also transmitted, and the alpha value is reduced due to an increase in the power variation of the transmitted symbols 702, 704, and 706 of the QAM signals ($s_2$) as compared with the third superposition mode. When the signal $s_1$ and the signals $s_2$ overlap, the transmission device may adjust and add the transmission powers $P_1$ and $P_2$ of $s_1$ and $s_2$. The transmission device may variously change the power level of each of the symbols of the QAM signals ($s_2$) according to the power pattern. Preferably, $P_1$ may be greater than or equal to $P_2$.

Figure 8:
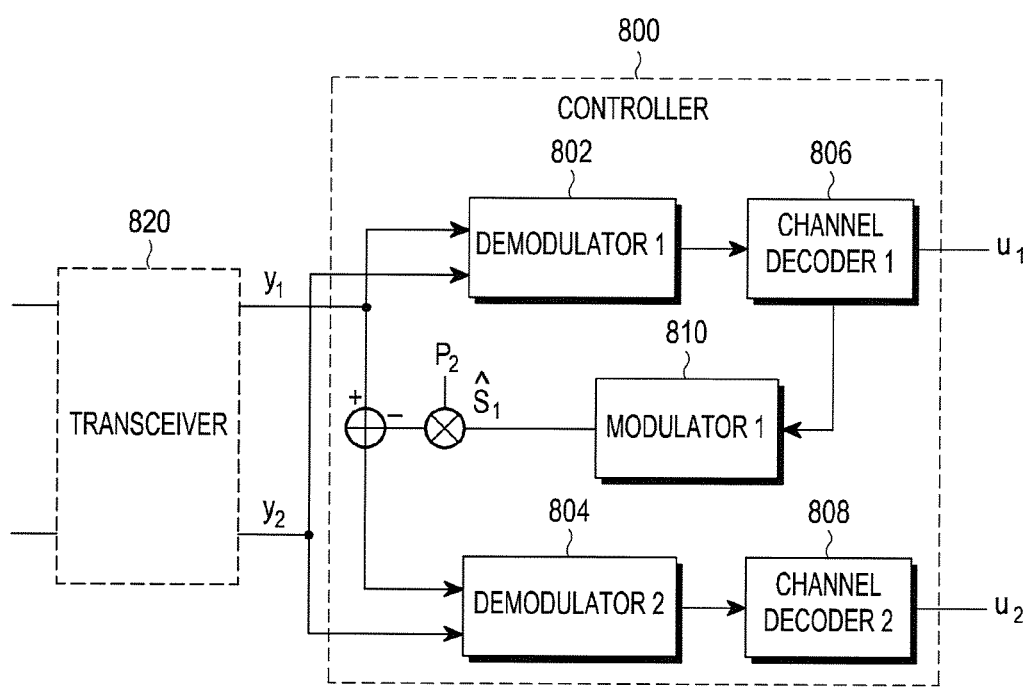
FIG. 8 is a view schematically illustrating a configuration of a reception device according to the present disclosure.

FIG. 8 is a view schematically illustrating a configuration of a reception device according to the present disclosure.

The reception device may be a UE (in downlink transmission) or may be a base station (in uplink transmission).

The reception device may include one or more demodulators 802 and 804 and one or more channel decoders 806 and 808. The reception device may further include a modulator 810 to generate a modulated symbol from a decoded codeword. The demodulators 802 and 804, the channel decoders 806 and 808, and the modulator 810 may be integrated into one component, for example, a controller 800. The reception device may further include a transceiver 820 to perform wireless transmission and reception. The transceiver 820 receives reception signals $y_1$ and $y_2$ through one or more transmission channels.

It would be understood that all operations of the reception device (that is, UE or the base station) described in the present disclosure are controlled or performed by the controller 800. Although FIG. 8 shows the controller 800 and the transceiver 820 as separate components for convenience, the controller 800 and the transceiver 820 may be configured as one component.

For example, the UE may demodulate and channel-decode the reception signals $y_1$ and $y_2$ to acquire message parts $u_1$ and $u_2$.

When the transmission device employs channel combining/splitting, the reception signals $y_1$ and $y_2$ are partially overlapped to be transmitted, and thus the reception device also performs demodulation and decoding in view of the overlapping reception signals.

A first method in which the reception device calculates the Log Likelihood Ratio (LLR) of a transmitted FQAM signal ($s_1$) is for the reception device to calculate the LLR value of $s_1$ in view of both of the reception signals $y_1$ and $y_2$. In the first method, the reception device demodulates the reception signals $y_1$ and $y_2$ using the demodulator 1 802 and the demodulator 2 804, respectively, in which the reception device demodulates the signal $y_1$ on an overlapping constellation of FQAM and QAM to calculate the LLR value of $s_1$. The LLR value of $s_1$ is calculated in view of both of the reception signals $y_1$ and $y_2$ according to the following equation.

$$\log Pr[y_1, y_2 | s_1] = \frac{1}{q} \log \left\{ \sum_{s_2 \in GF(q)} Pr[y_1 | s_1 \oplus s_2] \cdot Pr[y_2 | s_2] \right\} \quad \text{[Equation 2]}$$

$$= \frac{1}{q} \log MAP\{Pr[y_1 | s_1 \oplus 0]$$

$$Pr[y_2 | 0], Pr[y_1 | s_1 \oplus 1]$$

$$Pr[y_2 | 1], \cdots,$$

$$Pr[y_1 | s_1 \oplus q - 1] Pr[y_2 q - 1]\}$$

$$\cong \frac{1}{q} \max_{s_2 \in GF(q)} \{L_1(s_1 \oplus s_2) + L_2(s_2)\}$$

Here, $L_1(x_1) \equiv \log Pr[y_1 | x_1]$, $L_2(x_2) \equiv \log Pr[y_2 | x_2]$, and $\log MAP(x, y) = \max(x, y) + \log(1 + e^{-|x-y|})$.

A second method in which the reception device calculates the LLR of a transmitted FQAM signal ($s_1$) is for the reception device to calculate the LLR of $s_1$ by considering a part $P_2^* s_2$ of the reception signal $y_1$ as a Gaussian noise. The reception device may perform FQAM demodulation on $y_1$ using the demodulator 1 802 to calculate the LLR of $s_1$.

The reception device may perform channel decoding in the channel decoder 1 806 using the LLR value of $s_1$ obtained by the first method or second method, thereby acquiring a first part $u_1$ of a message.

In order to calculate the LLR value of $s_2$, the reception device needs information on $s_1$. Thus, the reception device FQAM-demodulates the acquired first part $u_1$ of the message (that is, a decoded codeword) using the modulator 810 to generate a demodulated symbol $\hat{s}^1$ of $s_1$.

The reception device calculates the LLR value of $s_2$ based on a signal $(y_1 - \hat{s}_1)$ of the modulated symbol $\hat{s}_1$ subtracted from a first part $y_1$ of the reception signals using the demodulator 2 804 and calculates the LLR value of $s_2$ from a second part $y_2$ of the reception signals. The reception device may add the LLR value of $s_2$ obtained based on $(y_1 - \hat{s}_1)$ and the LLR value of $s_2$ obtained from $y_2$, thereby obtaining the final LLR value of $s_2$. Here, an operation of adding the LLR value of $s_2$ obtained based on $(y_1 - \hat{s}_1)$ and the LLR value of $s_2$ obtained from $y_2$ corresponds to a multiplication operation on a probability domain and may be represented by the following equation.

$$\log Pr[y_1, y_2, s_1 | s_2] = \frac{1}{q} \log Pr[y_1 | s_1 \oplus s_2] Pr[y_2 | s_2] \quad \text{[Equation 3]}$$

$$= \frac{1}{q} \left\{ \begin{array}{l} \log Pr[y_1 - \hat{s}_1 | s_2] + \\ \log Pr[y_2 | s_2] \end{array} \right\}$$

The reception device may perform channel decoding using the obtained LLR value of the acquired signal $s_2$ in the channel decoder 2 808, thereby acquiring a second part $u_2$ of the message.

Figure 9:
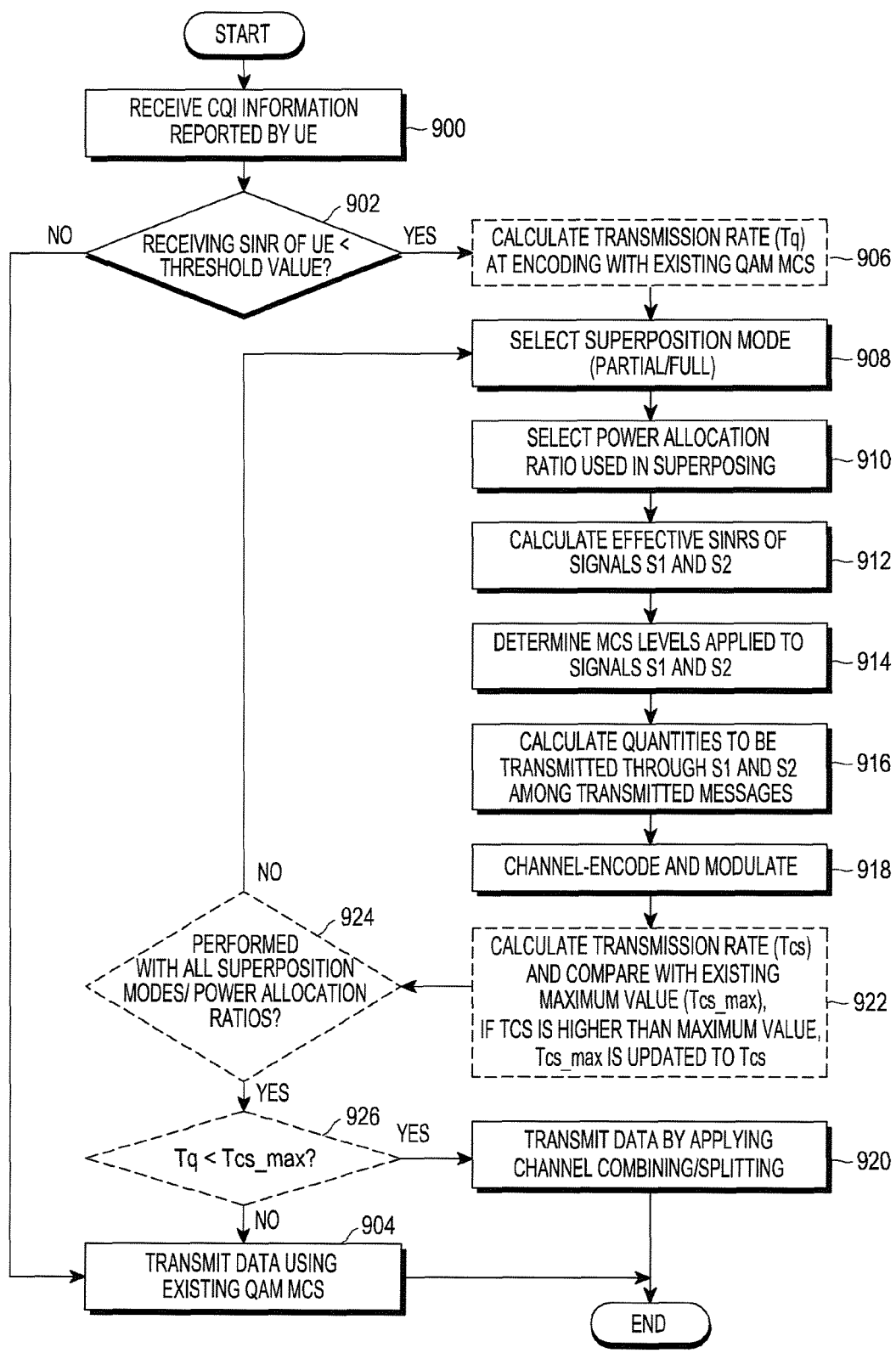
FIG. 9 is a view illustrating a downlink transmission method of a base station that performs channel combining/splitting according to the present disclosure.

FIG. 9 is a view illustrating a downlink transmission method of a base station that performs channel combining/splitting according to the present disclosure.

The base station may selectively perform one or more operations among the following operations. Since the individual operations illustrated in the drawing are not to limit the scope of the present disclosure, all the operations included in the drawing are not necessarily included but only part thereof may be included in order to implement the present disclosure. Further, it should be noted that the operations may be performed in a different order from that indicated in the drawing.

The base station may receive Channel Quality Indicator (CQI) information, which is reported by at least one UE belonging to the base station, through a Physical Uplink Control Channel (PUCCH) or Physical Uplink Shared Channel (PUSCH) (900). The report of the CQI information by the UE may be performed periodically or aperiodically.

The base station may compare an SINR value of the UE determined based on the CQI information with a predetermined threshold value (902). The base station may determine whether to schedule a downlink communication of the UE and a transmission method according to a result of comparing the SINR with the threshold value. For example, the base station may compare the SINR value of the UE to be scheduled with a specific threshold value (for example, 3 dB) to determine whether to apply a channel combining/splitting method as a downlink transmission mode for the UE.

When the result of the comparison in 902 indicates that the receiving SINR of the UE is not less than the threshold value, the base station may determine to perform a QAM-based Modulation and Coding Scheme (MCS) operation 904 (for example, 16 QAM, 64 QAM, channel encoding, or the like) for the UE, instead of applying channel combining/splitting. For example, when a CQI value reported by the UE is greater than 6 (for example, one of 7 to 15 in an LTE system), the receiving SINR of the UE has a value greater than 3 dB. Here, the base station may perform downlink scheduling so that the UE performs an existing operation (that is, a QAM-based MCS operation corresponding to the CQI).

When the result of the comparison in 902 indicates that the receiving SINR of the UE is less than the threshold value, the base station may perform an additional operation for applying channel combining/splitting to the UE. For example, when a CQI value fed back by the UE is 6 or less (for example, one of 1 to 6 in the LTE system), the receiving SINR of the UE has a value less than 3 dB. Here, the base station may determine that the channel combining/splitting technique is applicable to the UE and thus may perform the following additional operation.

Optionally, the base station may calculate a transmission rate Tq at the application of a QAM-based MCS (906).

The base station may select a superposition mode to be used for the generation of a transmission signal (908). For example, the base station may select one of the superposition modes described in FIG. 4 to FIG. 7. Specifically, the base station may select superposition mode 1 (partial superposition) when symbols included in a message have different levels of importance; and may select superposition mode 2 (full superposition) when all symbols included in a message have the same level of importance.

The base station may select a power allocation ratio between overlapping signals $s_1$ and $s_2$ (910). The base station may generate a transmission signal using the determined power allocation ratio when the signals $s_1$ and $s_2$ overlap in the selected superposition mode.

The base station may calculate the effective SINR values of modulated symbols $s_1$ and $s_2$ (912).

A modulation technique for $s_1$ is an FQAM technique generated by the combination of FSK with an order of $M_F$ and PSK with an order of $M_Q$. Here, the effective SINR of a modulated symbol $s_1$ may be represented by the following equation.

$$10 \log_{10} \frac{(1-\rho)P}{\rho P + N_0} \quad \text{[Equation 4]}$$

Here, $\rho$ (rho) is a variable to adjust a power ratio between $s_1$ and $s_2$, $(1-\rho)P$ is the transmission power of $s_1$, and $N_0$ is noise power.

Further, the effective SINRs of a modulated symbol $s_2$ in superposition mode 1 and superposition mode 2 may be represented by the following equations.

$$\text{(Superposition mode 1): } 10 \log_{10} \frac{(1+\rho)P}{N_0} \quad \text{[Equation 5]}$$

$$\text{(Superposition mode 2): } 10 \log_{10} \frac{(1+M_F \cdot \rho)P}{N_0}$$

Here, $\rho$ is a variable to adjust a power ratio between $s_1$ and $s_2$, $(\rho)P$ is the transmission power of $s_2$, $N_0$ is noise power, and $M_F$ is the order of an FSK component in FQAM.

The base station may determine MCS levels for $s_1$ and $s_2$ according to the determined effective SINR values of $s_1$ and $s_2$ (914). Here, it is assumed that the base station has MCS level information on QAM and FQAM.

The base station may calculate the quantities of the modulated symbols $s_1$ and $s_2$ in a transmitted message (916). The base station separates the transmitted message u into $u_1$ and $u_2$, and channel-encodes and modulates $u_1$ and $u_2$ to transmit the modulated symbols $s_1$ and $s_2$. The quantities of the modulated symbols $s_1$ and $s_2$ may be calculated by the following equations.

In superposition mode 1 (partial superposition), the quantities of messages transmitted through $s_1$ and $s_2$ is as follows.

$$m_1 = m \cdot \frac{se_1}{se_1 + se_2}, \; m_2 = m \cdot \frac{se_2}{se_1 + se_2} \quad \text{[Equation 6]}$$

In superposition mode 2 (full superposition), the quantities of messages transmitted through $s_1$ and $s_2$ is as follows.

$$m_1 = m \cdot \frac{M_F \cdot se_1}{M_F \cdot se_1 + se_2}, \; m_2 = m \cdot \frac{se_2}{M_F \cdot se_1 + se_2} \quad \text{[Equation 7]}$$

Here, $se_1$ is the spectral efficiency (SE) of a determined MCS level for $s_1$, and $se_2$ the SE of a determined MCS level for $s_2$. m is the quantity of the entire message, $m_1$ is the quantity of a message to be transmitted through $s_1$, and $m_2$ is the quantity of a message to be transmitted through $s_2$. $M_F$ is the order of an FSK component in FQAM.

The base station may separate the entire message based on the determined quantities and may channel-encode and modulate the separated message using respective MCSs (918).

The base station may apply the channel combining/splitting technique to $s_1$ and $s_2$, which are generated by the channel encoding and modulation, to transmit $s_1$ and $s_2$ (920). That is, the base station generates a transmission signal from $s_1$ and $s_2$ using the selected superposition mode and the determined power allocation ratio and transmits the transmission signal through a transmission channel.

Optionally, in order to find an optimal combination of a superposition mode and a power allocation ratio, the base station may further perform an operation of calculating transmission rates based on all superposition modes and all power allocation ratios to find a superposition mode and a power allocation ratio for the highest transmission rate. Specifically, the base station may calculate a transmission rate Tcs based on the currently selected superposition mode and power allocation ratio and may compare the transmission rate Tcs with the existing maximum transmission rate Tcs_max (922). Here, when Tcs is higher than Tcs_max, Tcs_max may be updated to the value of Tcs. Further, the base station may check whether comparisons of transmission rates based on all superposition modes and all power allocation ratios are completed, and may perform operations 908 to 918 and 922 again when the comparisons are not completed. When the comparisons of transmission rates based on all superposition modes and all power allocation ratios are completed, the base station may compare a transmission rate Tq at transmission using the QAM-based MCS with the maximum transmission rate Tcs_max (926). When Tcs_max is higher than Tq, the base station may apply channel combining/splitting to transmit data. When Tcs_max is not higher than Tq, the base station may transmit data using the existing QAM-based MCS technique, instead of applying the channel combining/splitting technique (since the application of channel combining/splitting brings no advantage).

Here, the base station may indicate, to the UE, information on the determined superposition mode and information on the power allocation ratio. Specific details on a method of indicating the determined pieces of information to the UE will be mentioned in detail in Table 1 and Table 2.

Figure 10:
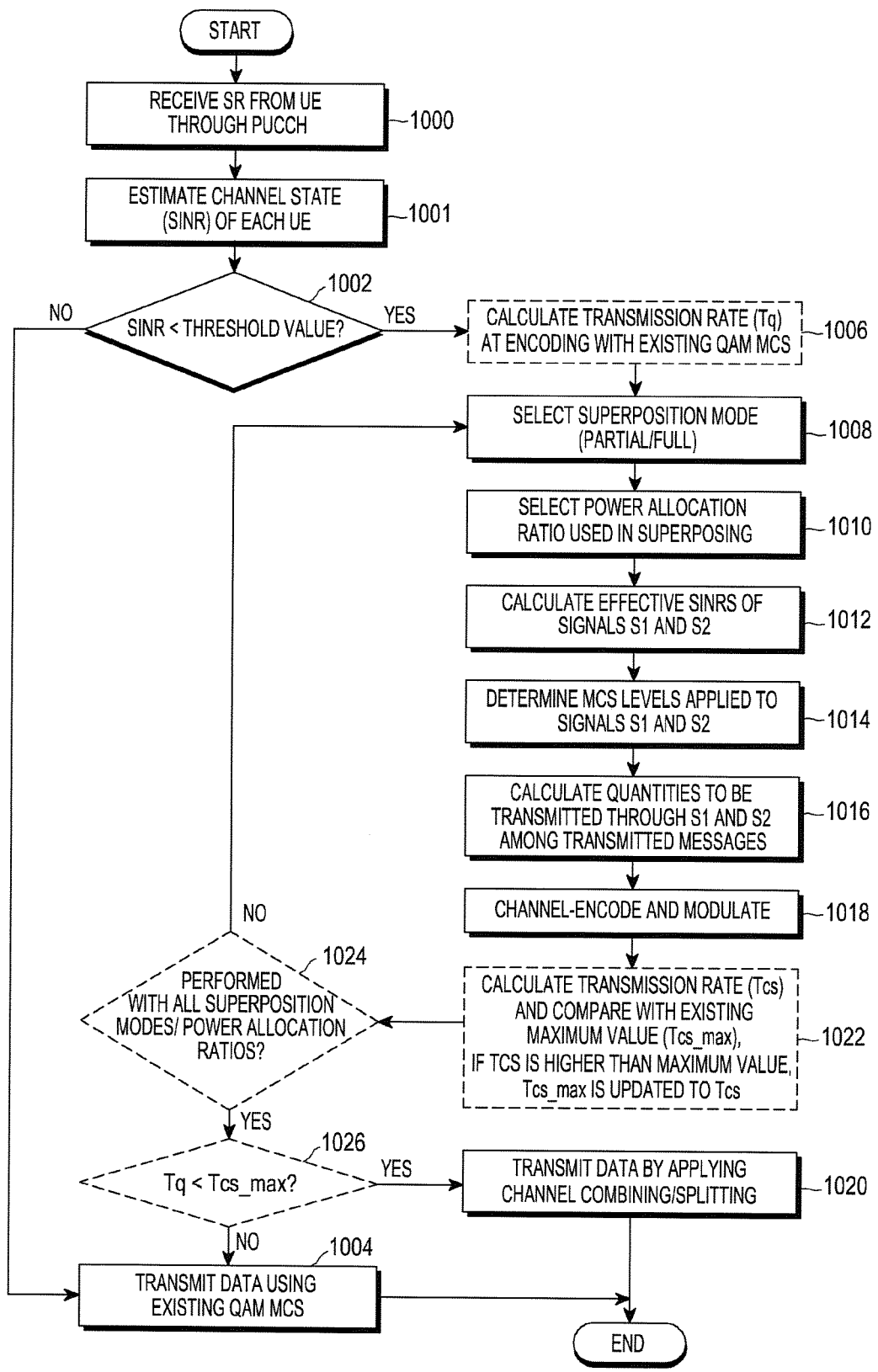
FIG. 10 is a view illustrating a scheduling method of a base station to perform uplink transmission using channel combining/splitting according to the present disclosure.

FIG. 10 is a view illustrating a scheduling method of a base station to perform uplink transmission using channel combining/splitting according to the present disclosure.

The base station may selectively perform one or more operations among the following operations. Since the individual operations illustrated in the drawing are not to limit the scope of the present disclosure, all the operations included in the drawing are not necessarily included but only part thereof may be included in order to implement the present disclosure. Further, it should be noted that the operations may be performed in a different order from that indicated in the drawing.

The base station may receive, from a UE, a scheduling request (SR) for uplink transmission through a PUCCH (1000).

The base station may estimate the state of a channel with the UE, which has transmitted the SR, to determine the SINR of the UE (1001).

The base station may compare the estimated SINR with a predetermined threshold value (1002). The base station may schedule an uplink communication of the UE according to a result of comparing the SINR with the threshold value. For example, the base station may compare the SINR value of the UE to be scheduled with a predetermined specific threshold value (for example, 3 dB) to determine whether to apply the channel combining/splitting method as an uplink transmission mode for the UE.

When the result of the comparison in 1002 indicates that the estimated SINR of the channel with the UE is not less than the threshold value, the base station may allocate a QAM-based MCS for the UE, instead of applying channel combining/splitting (1006).

When the result of the comparison in 1002 indicates that the estimated SINR of the channel with the UE is less than the threshold value, the base station may perform an additional operation for applying channel combining/splitting to the UE (operations 1006 to 1018 and operations 1022 to 1026). Operations 1006 to 1018 and operations 1022 to 1026 are the same as operations 906 to 918 and operations 922 to 926 of FIG. 9, and thus a description thereof is omitted herein.

When the base station determines to apply channel combining/splitting to the UE, the base station may apply channel combining/splitting to the UE to allocate an MCS (1020).

Although it has been described that the channel combining/splitting technique is applied to two channels for convenience, the channel combining/splitting technique may also be applied through a plurality of channels greater than two channels.

Figure 11:
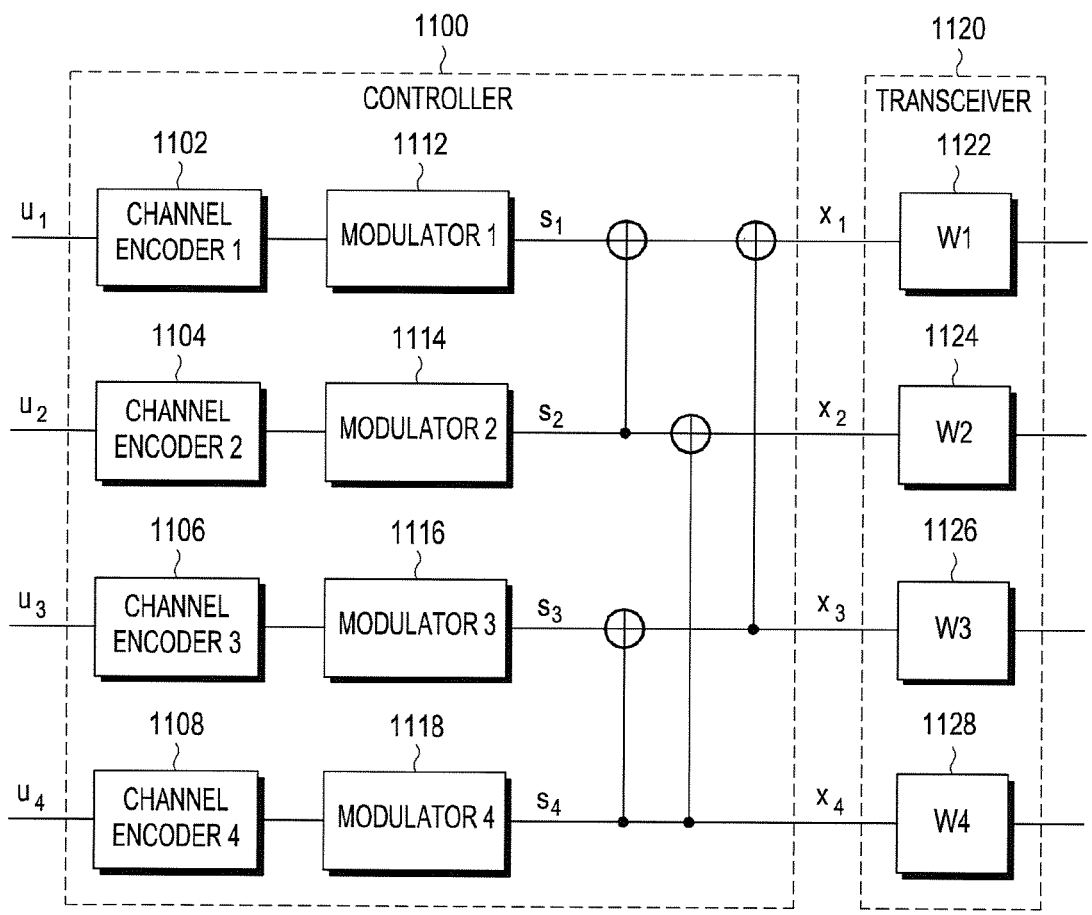
FIG. 11 is a view schematically illustrating a configuration of a transmission device that applies a channel combining/splitting technique through four channels according to the present disclosure.

FIG. 11 is a view schematically illustrating a configuration of a transmission device that applies a channel combining/splitting technique through four channels according to the present disclosure.

The transmission device may be a base station (in downlink transmission) or may be a UE (in uplink transmission).

The transmission device may include one or more channel encoders 1102, 1104, 1106, and 1108 and one or more modulators 1112, 1114, 1116, and 1118. The channel encoders 1102, 1104, 1106, and 1108 and the modulators 1112, 1114, 1116, and 1118 may be integrated into one component, for example, a controller 1100. The transmission device may further include a transceiver 1120 to perform wireless transmission and reception. The transceiver 1120 may be a wireless transceiving module to realize one or more transmission channels 1122, 1124, 1126, and 1128.

It would be understood that all operations of the transmission device (that is, the base station or UE) described in the present disclosure are controlled or performed by the controller 1100. Although FIG. 11 shows the controller 1100 and the transceiver 1120 as separate components for convenience, the controller 1100 and the transceiver 1120 may be configured as one component.

For example, when the base station intends to send a message by applying the channel combining/splitting method according to the present disclosure, the base station may split a message u to be transmitted to a random UE (for example, a UE located in a cell-edge environment) into four parts ($u_1$, $u_2$, $u_3$, and $u_4$) and may perform encoding and modulation on each split part to generate a transmission signal. Here, the entire message u may be divided into $u_1$, $u_2$, $u_3$, and $u_4$ in proportion to the spectral efficiencies of four transmission channels W1, W2, W3, and W4, in which $u_1$, $u_2$, $u_3$, and $u_4$ may be separated with the same size.

The controller 1100 of the transmission device may split a transmitted message u into four parts $u_1$, $u_2$, $u_3$, $u_4$ and may subject the split messages $u_1$, $u_2$, $u_3$, and $u_4$ to channel encoding in the respective channel encoders 1102, 1104, 1106, and 1108 and to modulation in the respective modulators 1112, 1114, 1116, and 1118, thereby generating modulated symbols $s_1$, $s_2$, $s_3$, and $s_4$.

The base station may use a modulated symbol $s_4$, as it is, as a fourth transmission signal $x_4$. The base station may overlap modulated symbols $s_3$ and $s_4$ to generate a third transmission signal $x_3$. The base station may overlap modulated symbols $s_2$ and $s_4$ to generate a second transmission signal $x_2$. The base station may overlap modulated symbols $s_1$, $s_2$, and $s_3$ (overlapping with $s_4$) to generate a first transmission signal $x_1$.

To support the channel combining/splitting method described in the present disclosure, the base station is required to transmit pieces of information as control information to the UE. An example of such information may be at least one of information indicating whether channel combining/splitting transmission is applied, an application step number indicating the number of split channels in the application of the channel combining/splitting technique, and MCS level information on QAM or FQAM to be used for transmission channels (W+ and W−).

When the base station transmits channel combining/splitting-applied data to a UE through a Physical Downlink Shared Channel (PDSCH), changes in Downlink Control Information (DCI) of a Physical Downlink Control Channel (PDCCH) transmitted by the base station are as follows. First, control information in a different form from an existing one, such as MCS information on two or more channels for transmitting split messages in the application of the channel combining/splitting technique, needs to be transmitted. Second, since it is impossible to transmit necessary information in an existing DCI format, a new DCI format needs to be defined.

The content of DCI in view of the foregoing changes is illustrated below.

Table 1 and Table 2 illustrate an example of control information signaled by the base station to the UE.

TABLE 1

| | Contents |
|---|---|
| Resource Information | Carrier indicator<br>Only present if cross-carrier scheduling is enabled via RRC signaling.<br>Resource block allocation (Variable)<br>Indicates which the terminal should receive PDSCH.<br>Three types: type 0, type 1, and type 2<br>Type 0 and type 1 support non-contiguous resource-block allocations and have the same size.<br>Type 2 has a smaller size and support contiguous allocations only<br>DL assignment index (2 bits)<br>Informing the terminal about the number of DL transmissions Present for TDD only |
| HARQ-related Information | HARQ-process number (3 bits for FDD, 4 bits for TDD) informing the UE about the HARQ process to use for soft combining |
| Transport block-related Information | For the first transport block<br><u>Modulation and coding scheme of the first codeword (5 bits)</u><br><u>Modulation and coding scheme of the second codeword (5 bits)</u><br><u>MCS for the third/fourth codeword (5bits) (if needed)</u><br>New-data indicator (1 bit)<br>Redundancy version (2 bits)<br>For the second transport block (only present in DCI format supporting spatial multiplexing)<br><u>Modulation and coding scheme of the first codeword (5 bits)</u><br><u>Modulation and coding scheme of the second codeword (5 bits)</u><br><u>MCS for the third/fourth codeword (5 bits) (if needed)</u><br>New-data indicator (1 bit)<br>Redundancy version (2 bits) |

TABLE 2

| | Contents |
|---|---|
| Multi antenna-related Information | PMI confirmation (1 bit)<br>Present in format 1B only<br>Indicates whether the eNodeB uses the precoding matrix recommendation from the terminal.<br>Precoding information<br>Precoder matrix index used for DL transmission<br>Number of transmission layers<br>Transport block swap flag (1 bit)<br>Indicating whether the two codewords should be swapped prior to being fed to the HARQ<br>Used for averaging the channel quality between the codebooks<br>Power offset between PDSCH and CRSs<br>Used to support dynamic power sharing between multiple terminals for MU-MIMO<br>RS scrambling sequence |
| Others | Transmit-power control for PUCCH (2 bits)<br>DCI format 0/1A indication (1 bit)<br>Used to differentiate between DCI formats 1A and 0 as the two formats have the same message size.<br>Padding<br>To ensure the same payload size irrespective of the uplink and downlink cell bandwidths<br>Used to avoid certain DCI sizes that may cause ambiguous decoding of PHICH.<br>Identity (RNTI) of the terminal for which the PDSCH transmission is intended (16 bits)<br>The identity is not explicitly transmitted but implicitly included in the CRC calculation.<br><u>For Channel Combining/Splitting</u><br><u>Channel Combining/Splitting Steps (1 bit~)</u><br><u>Types of Superposition (1 bit~)</u><br><u>Power Allocation (2 bits~)</u><br><u>Indication of message indices of s2 superimposed in s1 (if needed)</u> |

Underlined entries in Table 1 and Table 2 are information that may be added to, or be modified in, DCI to support the channel combining/splitting technique according to the present disclosure.

It may be determined based on a DCI format type whether the base station applies channel combining/splitting to a specific UE. For example, in the case of DCI Format 4, the UE may determine that channel combining/splitting transmission is applied.

The number of steps in which applied channel combining/splitting is applied may be indicated by 1-bit information "Channel Combining/Splitting Steps" in an "Others" entry. For example, level 2 indicating that a channel is split into two channels may be indicated by '0,' and level 4 indicating that a channel is split into four channels may be indicated by '1.' The information "Channel Combining/Splitting Steps" may be transmitted only when the base station supports different levels of channel combining/splitting transmission.

MCS level information on QAM or FQAM used for a plurality of channels (for example, W− and W+) of channel combining/splitting may be indicated by at least one of 5-bit "Modulation and coding scheme of the first codeword," "Modulation and coding scheme of the second codeword," and "MCS for the third/fourth codeword," which are included in "For the first transport block" information or "For the second transport block" in a "Transport block-related Information" entry. For example, "Modulation and coding scheme of the first codeword" may indicate an MCS for the transmission signal $s_1$ in FIG. 3.

A superposition mode applied in transmission signal generation may be indicated by 1-bit information "Types of Superposition" in the "Others" entry. For example, superposition mode 1 representing partial superposition may be indicated by '0,' and superposition mode 2 representing full superposition may be indicated by '1.'

Information indicating the allocated power of modulated symbols in transmission signal generation may be indicated by two-bit information "Power Allocation" in the "Others" entry. For example, power allocation at $P_1$: $P_2$=1:2 may be indicated by '00,' power allocation at $P_1$: $P_2$=1:1 may be indicated by '01,' power allocation at $P_1$:$P_2$=2:1 may be indicated by '10,' and power allocation at $P_1$:$P_2$=3:1 may be indicated by '11.'

Optionally, information indicating symbols of a signal $s_2$ sequentially overlapping symbols of a signal $s_1$ in partial superposition mode (superposition mode 1) may be indicated by information "Indication of message indices of $s_2$ superimposed in $s_1$" in the "Others" entry. The "Indication of message indices of $s_2$ superimposed in $s_1$" information may include one or more indices ($s_2$ index, $s_2$ index, . . . ).

Meanwhile, the UE may transmit information (1 bit) indicating whether the UE is able to operate according to the channel combining/splitting technique when accessing the base station. In addition, the UE may feed back channel state information (CSI) including CQI, a rank indicator (RI), and a precoding matrix indicator (PMI) to the base station.

Figure 12:
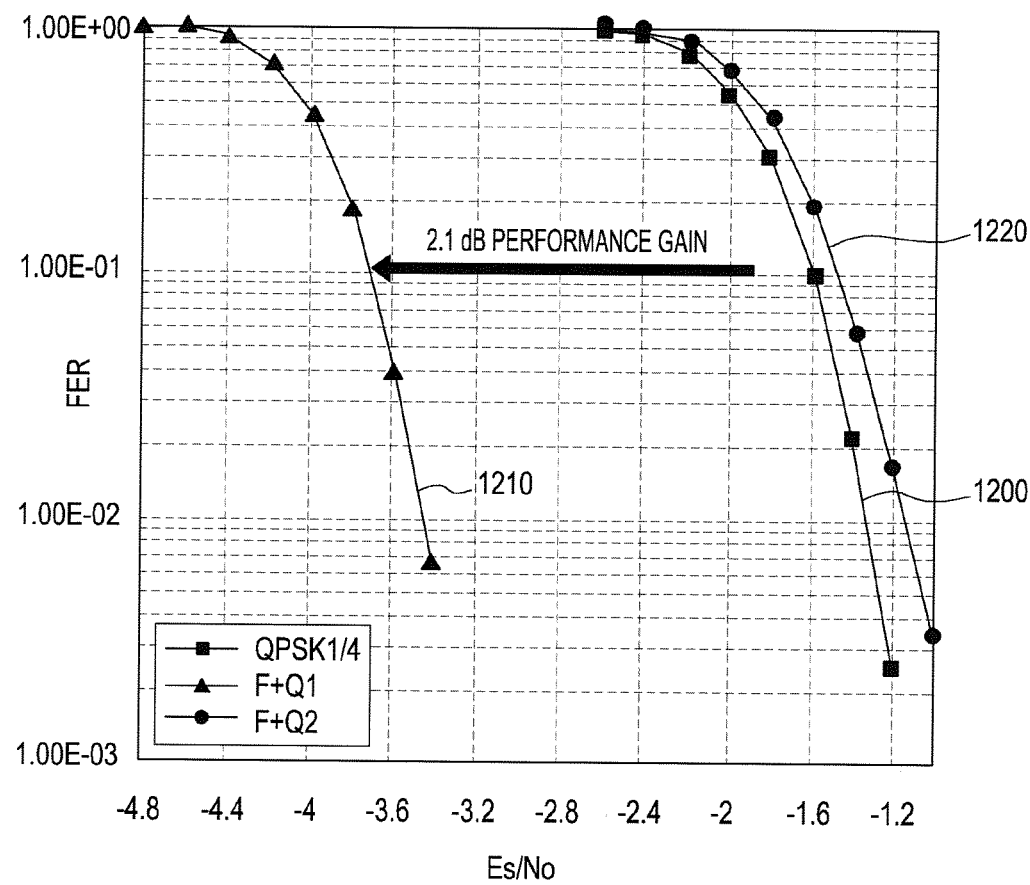
FIG. 12 is a graph illustrating effects in SE and FER obtained when the channel combining/splitting technique according to the present disclosure is applied.

FIG. 12 is a graph illustrating effects in SE and FER obtained when the channel combining/splitting technique according to the present disclosure is applied.

In FIG. 12, the x-axis represents an SNR, and the y-axis represents a frame error rate (FER), which is used as a performance indicator. The SNR is expressed in energy per symbol (Es) with respect to noise power No.

A graph indicated by 1200 represents performance in transmission according to a conventional scheme (QPSK), and 1210 represents the performance of a channel combining/splitting technique (F+Q1) designed to have a similar spectral efficiency to that of the conventional scheme. 1220 represents the performance of a channel combining/splitting technique (F+Q2) designed to have a similar performance to that of the conventional scheme.

Table 3 shows the spectral efficiencies and performances of the three schemes illustrated in FIG. 12 for comparison.

TABLE 3

| Performance indicator | QPSK r = ¼ | F + Q1 (4F4Q, r = ½) + (QPSK, r = ⅓) | F + Q2 (4F8Q, r = ½) + (QPSK, r = ½) |
|---|---|---|---|
| Spectral efficiency (SE) | 0.5 | 0.533 | 0.7 (40% Gain) |
| SNR (to achieve FER = 0.1) | −1.6 dB | −3.7 dB (2.1 dB Gain) | −1.5 dB |

As seen from Table 3, the F+Q 1 scheme has a similar spectral efficiency (0.533) to that of the conventional scheme (QPSK r=¼) but has an SNR which is about 2.1 dB lower than that of the conventional scheme to achieve the same FER, while the F+Q 2 scheme has a similar performance (−1.5 dB) to that of the conventional scheme (QPSK r=¼) but has a 40% gain in spectral efficiency. Here, r is a coding rate.

It should be noted that the configuration views of the systems, the views illustrating a congestion control method, and a view illustrating the marking of a GTP-U header, which are shown in FIG. 2 to FIG. 12, are not intended to restrict the scope of the present disclosure. That is, all component units or the steps of operations illustrated in FIG. 2 to FIG. 12 are not construed as essential elements to implement the present disclosure, and only some elements may be included to implement the present disclosure without departing from the nature of the present disclosure.

The above described operations may be implemented by having a memory device, which stores a corresponding program code, in any constituent unit within an entity, a function, a base station, or a UE apparatus of the communication system. That is, the entity, the function, the load manager, or the controller of the terminal carries out the above described operations by reading and executing the program code stored in the memory device by means of a processor or a CPU.

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method of transmitting a message using a transmission scheme in a wireless communication system, the method comprising:

splitting the message into a first part to be transmitted through a first channel which is a degraded channel and a second part to be transmitted through a second channel which is an enhanced channel;

generating a first modulation signal by performing channel encoding and frequency and quadrature amplitude modulation (FQAM) on the first part, and generating a second modulation signal by performing channel encoding and quadrature amplitude modulation (QAM) on the second part;

generating a first transmission signal by combining the first modulation signal with part or all of the second modulation signal, and generating a second transmission signal using the second modulation signal; and transmitting the generated first transmission signal and second transmission signal through the first channel and the second channel, respectively.

2. The method as claimed in claim 1, wherein generating the first transmission signal comprises:

generating the first transmission signal by superposing some or all of symbols of the second modulation signal onto symbols of the first modulation signal.

3. The method as claimed in claim 2, wherein a symbol not superposed onto the symbols of the first modulation signal among the symbols of the second modulation signal is not included in the first transmission signal.

4. The method as claimed in claim 2, wherein a random power allocation ratio is applied to the superposed symbols of the first modulation signal and the superposed some or all of symbols of the second modulation signal.

5. The method as claimed in claim 2, wherein the some or all of symbols of the second modulation signal superposed onto the symbols of the first modulation signal are determined according to a predetermined rule.

6. The method as claimed in claim 1, wherein generating the first transmission signal comprises:

generating the first transmission signal by applying a random power pattern to all symbols of the second modulation signal to change powers of the symbols of the second modulation signal and superposing some or all of the symbols of the second modulation signal onto symbols of the first modulation signal.

7. The method as claimed in claim 1, wherein the first channel and the second channel use a same radio frequency resource.

8. The method as claimed in claim 1, wherein the message is a message transmitted from a base station to a user equipment (UE) located on a cell edge.

9. A method of receiving a message from a transmitting device using a transmission scheme in a wireless communication system, the method comprising:

demodulating a first reception signal based on both the first reception signal received through a first channel which is a degraded channel and a second reception signal received through a second channel which is an enhanced channel;

calculating a log likelihood ratio (LLR) of the first reception signal; and acquiring a first codeword by channel-decoding the first reception signal using the LLR of the first reception signal.

10. The method as claimed in claim 9, further comprising:

generating a modulated symbol by modulating the first codeword;

calculating a first LLR of the second reception signal by demodulating a signal obtained by subtracting the modulated symbol from the first reception signal, and calculating a second LLR of the second reception signal by demodulating the second reception signal; and channel-decoding the second reception signal using a value of the first LLR added to the second LLR.

11. The method as claimed in claim 9, wherein demodulating the first reception signal based on both the first reception signal and the second reception signal comprises:

demodulating the first reception signal on a superposed constellation of frequency and quadrature amplitude modulation (FQAM) and quadrature amplitude modulation (QAM).

12. A device for transmitting a message using a transmission scheme in a wireless communication system, the device comprising:

a controller configured to:
split the message into a first part to be transmitted through a first channel which is a degraded channel and a second part to be transmitted through a second channel which is an enhanced channel,
generate a first modulation signal by performing channel encoding and frequency and quadrature amplitude modulation (FQAM) on the first part,
generate a second modulation signal by performing channel encoding and quadrature amplitude modulation (QAM) on the second part,
generate a first transmission signal by combining the first modulation signal with part or all of the second modulation signal, and generate a second transmission signal using the second modulation signal; and a transceiver configured to transmit the generated first transmission signal and second transmission signal through the first channel and the second channel, respectively.

13. The device as claimed in claim 12, wherein the controller is configured to generate the first transmission signal by superposing some or all of symbols of the second modulation signal onto symbols of the first modulation signal.

14. A device for receiving a message from a transmitting device using a transmission scheme in a wireless communication system, the device comprising:

a transceiver configured to receive a first reception signal through a first channel which is a degraded channel, and receive a second reception signal through a second channel which is an enhanced channel; and a controller configured to demodulate the first reception signal based on both the first reception signal and the second reception signal, calculate a log likelihood ratio (LLR) of the first reception signal, and acquire a first codeword by channel-decoding the first reception signal using the LLR of the first reception signal.

15. The device as claimed in claim 14, wherein the controller is further configured to generate a modulated symbol by modulating the first codeword, calculate a first LLR of the second reception signal by demodulating a signal obtained by subtracting the modulated symbol from the first reception signal, calculate a second LLR of the second reception signal by demodulating the second reception signal, and channel-decode the second reception signal using a value of the first LLR added to the second LLR.

16. The device as claimed in claim 14, wherein the controller is configured to demodulate the first reception signal on a superposed constellation of frequency and quadrature amplitude modulation (FQAM) and quadrature amplitude modulation (QAM).

17. The device as claimed in claim 13, wherein a symbol not superposed onto the symbols of the first modulation signal among the symbols of the second modulation signal is not included in the first transmission signal.

18. The device as claimed in claim 13, wherein a random power allocation ratio is applied to the superposed symbols of the first modulation signal and the superposed some or all of symbols of the second modulation signal.

19. The device as claimed in claim 13, wherein the some or all of symbols of the second modulation signal superposed onto the symbols of the first modulation signal are determined according to a predetermined rule.

20. The device as claimed in claim 12, wherein the controller is configured to generate the first transmission signal by applying a random power pattern to all symbols of the second modulation signal to change powers of the symbols of the second modulation signal and superpose some or all of the symbols of the second modulation signal onto symbols of the first modulation signal.

* * * * *